Sept. 1, 1953 E. L. CALLAHAN 2,650,431
DEVICE FOR MEASURING HORIZONTAL AND VERTICAL ANGLES
Filed March 8, 1951 2 Sheets-Sheet 1

INVENTOR
EZRA LEO CALLAHAN
BY
Westall & Westall
ATTORNEYS

Sept. 1, 1953  E. L. CALLAHAN  2,650,431
DEVICE FOR MEASURING HORIZONTAL AND VERTICAL ANGLES
Filed March 8, 1951  2 Sheets-Sheet 2
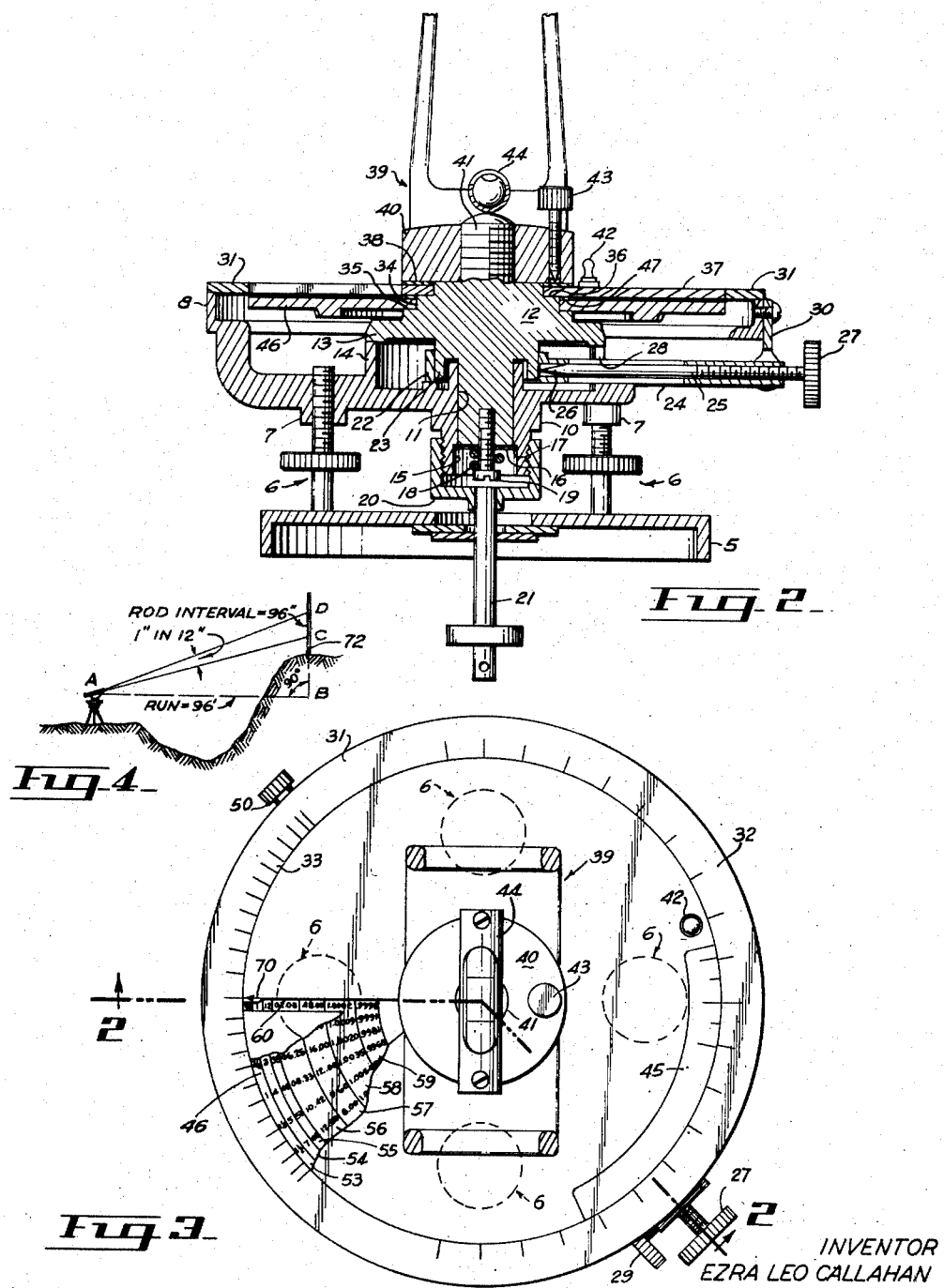
INVENTOR
EZRA LEO CALLAHAN
BY
Westall & Westall
ATTORNEYS

UNITED STATES PATENT OFFICE 2,650,431

DEVICE FOR MEASURING HORIZONTAL AND VERTICAL ANGLES

Ezra Leo Callahan, Inglewood, Calif.

Application March 8, 1951, Serial No. 214,511

6 Claims. (Cl. 33—69)

This invention relates generally to devices for measuring horizontal and vertical angles, as, for example, the odolites, transits and telescope-equipped levels.

With conventional devices of the type referred to, it is possible to determine distances which cannot be conveniently measured directly, by laying out, in either a horizontal or vertical plane, a triangle, one side of which is defined by a line connecting the subject points. This is accomplished by sighting with the telescope of the instrument centered at one of the points along the line extending to the other point to establish one side of the proposed triangle, the length of which side is to be determined, and thereafter laying off an interval upon a rod disposed perpendicular to the line established and extended from the distant point by swinging the telescope from its original position to sight along a line connecting a point upon the rod defining the desired length of the interval. With the degree of the angle, formed between the lines of sight, and the length of the interval, known, the length of the sides of the triangle, i. e., the distance to be obtained, may be calculated geometrically.

This method requires the mathematical solution of a right triangle having one known altitude and angle. Its solution, to obtain the run or base line, requires the following solution:

$$\frac{r}{R} = \tan. \theta; R = \frac{r}{\tan. \theta}$$

or $$\frac{R}{r} = \cot. \theta; R = r \cot. \theta$$

wherein R equals the run or base and $r$ equals the rise. When the run or base line is not accessible at the 90° angle and the triangle formed by the rod interval and two lines of sight is oblique, the solution involves the solution of many angles and triangles.

Many persons who require the above indicated information, obtainable by the use of such transit instruments, are unfamiliar with the applicable geometrical rules inherent in such calculations, with the result that their most effective utility of such devices is seriously limited.

It is a general object therefore to provide a transit instrument incorporating means operable in response to simple mechanical adjustments to indicate directly in feet and fractions thereof, the run or base distance between two points, under conditions where each of the points are accessible, the manipulation of the conventional mechanism embodied in the instruments being identical with standard practice, but obviating the need for calculations or use of supplementary conversion tables in order to obtain the required results.

More specifically, an object of the present invention is the provision of a transit or the like which includes a rise in twelve inch scale associated with means for measuring either horizontal or vertical angles, whereby a run or base distance between two points may be obtained incident to forming an angle having a vertex at one of said points and measured upon the rise in twelve inch scale to establish the length of an interval in inches upon a rod extending from the other point perpendicularly to the run or base line, the distance of which is to be measured, the measurement to be established being measured in feet of a number corresponding to the number of inches defining the length of the rod interval.

Another object hereof is to provide a transit instrument of the character described comprising essentially a telescope having associated therewith in any conventional manner a vertical arc for indicating vertical angles and a horizontal limb, rotatable relative to the telescope, both arc and limb bearing calibrations by which the degree of relative adjustment of the limb, arc and telescope may be ascertained, in combination with an annular indicia plate rotatable independently of the arc and horizontal limb, bearing conversion tables co-ordinated with the calibrations borne by the horizontal limb and vertical arc, whereby any angle formed in accordance with either vertical or horizontal adjustment of the telescope may be converted for immediate practical application, all information being visible from above and from any side of the instrument.

Still another object is the provision, in a transit instrument embodying a telescope and a relatively rotatable vernier plate, of means to impose sufficient friction between the telescope assembly and vernier plate to normally induce coincident rotation thereof, in combination with a vernier-plate clamping screw by which any predetermined adjustment of said elements may be fixed with respect to the telescope.

Other objects, including simplicity of construction, ease of operation, economy of manufacture and susceptibiilty of the novel features hereof to adaptation and application to various types of telescope-equipped instruments, will be apparent to those of skill in the art upon an examination of the following description read in the light of the accompanying drawings, in which:

Fig. 2 is a vertical sectional view, partially broken away through the horizontal limb and associated parts, omitting the telescope assembly, and taken on line 2—2 of Fig. 3;

Fig. 3 is a horizontal sectional view through the standard by which the telescope is supported showing in plan the vernier plate and horizontal limb, the vernier plate being broken away to illustrate in part the upper surface of the indicia plate therebelow and the tables carried by the latter;

Fig. 4 is a diagram depicting the solution, with the aid of a transit embodying my invention, of a typical problem.

Figure 1:
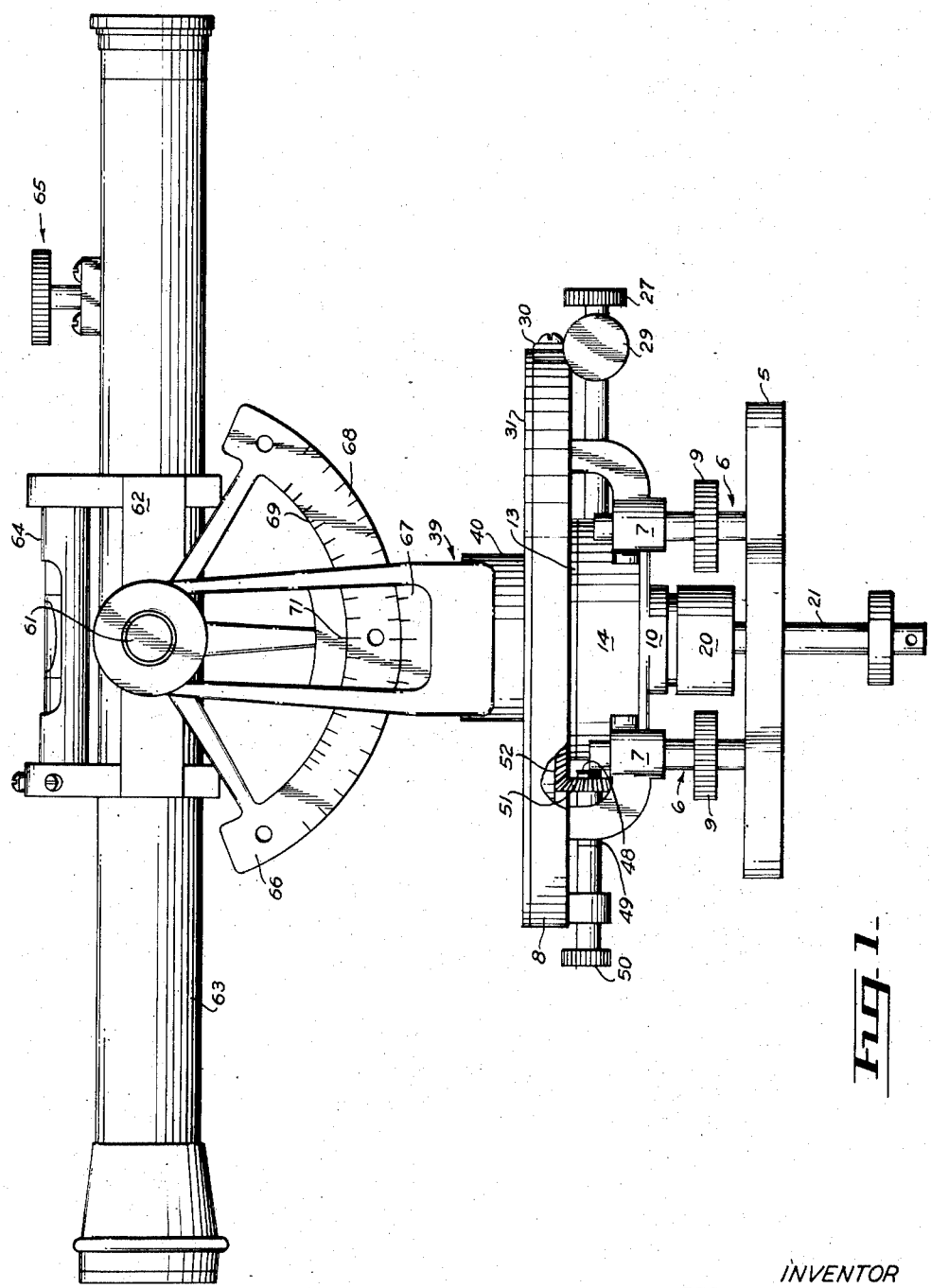
Fig. 1 is a side elevation of a transit embodying my invention.

Referring to the drawings more in detail, the numerals of which indicate similar parts throughout the several views, 5 designates a tripod plate which may be of conventional construction. Rotatably mounted upon the plate 5 are four leveling screws 6 arranged in a circumferentially equi-spaced relationship adjacent to the periphery of the plate in which they are journalled, so as to project upwardly into threaded engagement with depending bosses 7 integral with the base of a horizontal limb 8. Encircling and rigidly attached to each of the screws 6 is a knurled disc 9 by which the screws may be manually rotated so as to vary the angular relationship between the horizontal limb 8 and tripod plate 5 and thereby effect the leveling of the limb, as will be obvious. Coaxially related and integral with the horizontal limb 8 is a socket 10 having a central bore 11 forming a bearing for an inner center 12. Above the socket 10 of the limb 8 the center 12 is diametrically enlarged, forming a rim 13, the undersurface of which bears against and is supported by a complementary upstanding rim 14 integral with the horizontal limb. The lower end of the socket 10 is counter-bored as at 15 for reception of a washer 16 which is normally held against the annular downwardly-directed shoulder 17, formed by the enlargement of the lower bore, by a helical center spring 18 seated upon the head of a center screw 19, projecting upwardly through the washer 16 and threaded into the lower end of the inner center 12. It will be appreciated that by adjustment of the screw 19, the frictional resistance to relative rotation between the horizontal limb 8 and inner center 12 may be varied.

The lower end of the socket is externally threaded to receive a center cap 20 adapted to enclose the center spring 18. Depending from the center of the cap 20 and extending through an axial opening in the tripod plate 5 is a plumb bob suspension element 21 of conventional construction.

Relative rotation between the horizontal limb 8 and inner center 12 is restrained and critically determined by an inner center clamp assembly comprising a ring 22 which encircles a depending flange 23 integral with the inner center 12. Forming a part of the ring 22 is a radial tube 24 in the bore of which is threaded a set screw 25 having a pointed end 26 adapted to engage the flange 23 of the inner center 12 in response to rotative adjustment of a knurled knob 27 integral with the outer end of the screw 25. The tube 24 projects through an elongated slot 28 in the rim 14 of the horizontal limb 8, whereby, with the screw 25 engaged with the inner center 12, critical adjustment of the latter, limited by the ends of the slot 28, may be effected by a conventional tangent screw assembly 29 carried by a mount 30 depending from, and attached to, the periphery of the horizontal limb 8. As will be obvious to those of skill in the art, with screw 25 engaged, rotary manipulation of the tangent screw correspondingly critically adjusts the position of the inner center 12 with respect to the horizontal limb 8.

Superimposed upon and attached to the outer rim of the horizontal limb 8 is a horizontal circle plate 31 bearing a scale of degrees indicated at 32 and at the diametrically opposite side a rise in twelve inch scale 33. The upper part of the inner center 12 is diametrically reduced as at 34 forming an annular upwardly-directed shoulder 35 and a second diametric reduction forms an upwardly-directed shoulder 36. Supported upon the latter shoulder 36 is an annular vernier plate 37 of an outside diameter substantially corresponding with the inside diameter of the horizontal circle plate 31, with which the vernier plate 37 is flush. Superimposed upon the inner marginal edge of the vernier plate 37 and encircling the upper end of the inner center is a friction washer 38 adapted to bear upon the inner marginal edge of the vernier plate.

A telescope standard 39 is secured upon the inner center 12 and comprises a transverse base 40, threaded upon an upstanding stud 41, integral and coaxial with the inner center. The base 40 of the standard 39 overhangs and bears upon the washer 38 whereby a predetermined degree of friction is imposed upon the vernier plate 37 by the washer. The vernier plate 37 may thus be normally rotated with respect to both the horizontal limb 8 and telescope standard 39, a pin 42 mounted upon the vernier plate being provided to facilitate this adjustment manually. A knurl-headed screw 43 is threaded downwardly through the base 40 of the standard in vertical alignment with the friction washer 38 to permit the application of sufficient pressure to the washer to lock the vernier plate 37 and inner center 12 against rotative adjustment when required. 44 indicates a common form of level suitably mounted upon the base of the telescope standard 39. A vernier designated by the numeral 45 is carried by the periphery of the vernier plate 37 so as to coact in a conventional manner with the scale 32 borne by the horizontal limb 8. An index line 70 marked on the opposite side of the vernier plate 37 is employed to read the rise in twelve inch scale 33.

Encircling the inner center and supported upon the shoulder 35 below the vernier plate 37 is an indicia plate 46 adapted for rotation independently of both the inner center 12 and the horizontal limb 8. A washer 47, interposed between the inner marginal edge of the indicia plate 46 and the vernier plate 37, imposes upon plate 46 a slight degree of frictional resistance to rotation. Rotation of the indicia plate 46 relative to the horizontal limb 8 is accomplished manually by a radially-disposed shaft 48 journaled in the lower portion of the limb. Longitudinal movement of the shaft 48 in one direction is resisted by a collar 49 and in the opposite direction by an integral knurled knob 50 by which rotary adjustment of the shaft may be accomplished. The inner end of the shaft carries a bevel gear 51, the teeth of which mesh with a bevel gear ring 52 depending from the underside of the indicia plate 46.

The upper surface of plate 46 is divided by a series of concentric circles into a plurality of annular areas in which are marked circular columns of figures representing different tables of data required for effective use of the information obtained incident to relative adjustment of the telescope, hereinafter described. In the outermost annulus 53, a table of figures indicating the rise in inches and fractions thereof in twelve inches of the run or length of one side of each of a plurality of angles, is marked. The particular angles with which the components of the outermost table are coordinated, are indicated in the next two annuli 54 and 55 of the plate, in degrees and minutes, respectively. In the next annular column 56 is listed a series of figures, each representing for the different angles of annuli 54 and 55, the rise in terms of percentage of the run or length of one side of the angle. In the next annulus 57 a scale of earth slopes, i. e., figures indicating the run (or length of one side of an angle) in feet per rise of one foot for each of the angles noted in the corresponding transversely aligned sections of the degree table in annuli 54 and 55, are marked. In the next annulus 58 a series of multipliers for a multiplicand, corresponding to different runs or lengths of one side of any of a plurality of angles, are delineated, by which the slopes or lengths of the other sides of such angles may be determined. In the innermost annulus 59, a series of multipliers for multiplicands representing different slopes or lengths of corresponding sides of different angles, are marked, whereby the runs or lengths of other sides of particular angles may be ascertained. Thus with either the run or slope known, the length of one side of an angle of predetermined degree may be quickly and easily determined with accuracy by the simple multiplication of the known factor by the multiplier given. It will be understood that all transversely-aligned figures in the respective annuli of the several tables are coordinated so that all information carried by indicia plate 46 is instantly and conveniently available for any angle indicated.

In order to enable the reading of the tables and facilitate identification of any set of figures which may be pertinent to a particular problem, I provide a slot 60 (Fig. 3) radially disposed in the vernier plate 37 of a length substantially equal to the distance between the inner and outer edges of indicia plate 46 and of a width only slightly greater than the height of the individual figures carried by the plate. Slot 60 is located directly over plate 46 so as to permit registry of any set of radially aligned figures of the respective scales therewith. The surface of the plate 37 adjoining one side of slot 60 is divided by lines in a manner coincident with the concentric divisions of plate 46, each division bearing a label identifying the annular columns of figures, in alignment therewith, carried by the plate 46.

Journaled in the upper part of the standard 39 is a telescope axle assembly 61 of conventional construction by which a telescope mount 62 is pivotally supported. The telescope 63, rigidly secured in the mount 62, is thus vertically adjustable in accordance with conventional construction, the horizontal disposition of the same being determined by a level 64. 65 indicates a common form of focusing adjusting means for the telescope. Depending from the telescope axle 61 is a vertical circle 66 which is connected rigidly to the mount 62 so as to swing the arc of the circle relative to a vertical circle plate bearing a vernier 67 and an index line 71, the circle plate being suspended in fixed relationship with the standard 39. The vertical circle arc 66 bears the usual degree scale 68 and in addition is marked with a scale 69 comprising calibrations indicating corresponding rises in twelve inches.

It will be appreciated that an instrument constructed as described is capable of all usual utilities of similar devices of the prior art. The operation of a transit, dumpy level, Y level, convertible level, transit level or theodolite comprising horizontal or vertical arcs or both and bearing rise in twelve inch scales and an indicia plate carrying conversion tables in accordance with the present invention, is much easier of practical application by persons not familiar with the geometrical principles pertaining to the use of conventional transit instruments. For example, a problem frequently encountered is the determination of a run or base distance which cannot be measured with a tape. In accordance with the use of the present instrument in solving such a problem, a transit of my invention is set up at one terminal and a rod is placed in axial alignment with the other terminal and arranged perpendicular to the run or base line, the distance of which is to be ascertained. A point upon the rod is then sighted with the transit. Where practical, this point may coincide with the distant terminus of the line to be determined. The telescope 63 is then shifted from its original position along the rod an angle corresponding to a one inch rise per foot. The rod interval thus defined between successively sighted points on the rod is then measured by a tape or the like in inches and the number of inches indicated will correspond to the number of feet on the run or base line between the original points. For example, to determine the distance between two points at opposite sides of a river, the transit is set up at one of the points and, if the opposite point is accessible, a line is sighted to the latter point. The transit telescope is then shifted to sight along a line representing, with respect to the original line of sight between the points, a rise of one inch per foot. The number of inches between the sighted lines along an intersecting line or rod perpendicular to the line, the distance of which is to be determined, will correspond to the number of feet across the river between the original points, thus indicating directly the distance sought and obviating geometrical or arithmetical calculations commonly employed to obtain the required data from information available from conventional transits.

If the distant point defining the farther end of a base line, the length of which is to be determined (see Fig. 4), is not accessible, as for example, if it is located beneath the surface of a hill or the like, the rod may be disposed at any level directly above the distant point. In such case the rod 72 is plumbed in all directions. After first sighting the base line AB, the length of which is to be determined, the telescope is shifted to establish a reference line of sight AC terminating at a point upon the rod. The telescope is then swung vertically to a degree corresponding to a rise of one inch per foot with reference to the line AC sighted so as to sight the line AD and thereby define an interval CD upon the rod. As before, the measurement in inches of the interval thus established, indicates in feet the run or base distance AB between the two original points.

From the preceding examples the utility and operation of an instrument constructed as described will be apparent to those of skill in the art. The horizontal and vertical arcs may be used selectively, depending upon the nature of the terrain and the physical problems which the same may present.

What I claim and desire to secure by Letters Patent is:

1. In a transit instrument, a horizontal limb comprising an arc bearing a degree scale and a rise-in-twelve-inch scale, a relatively rotatable index plate coaxially related with said horizontal limb and having a radial slot, a telescope, means to pivot said telescope upon an axis coinciding with the axis of said limb and rotatably relative to the latter in a plane parallel to the plane of said scales, means carried by said plate to measure on each of said scales horizontal angles in terms of degree and rise in twelve inches formed between different lines of sight successively defined by different positions of said telescope, an indicia plate rotatably supported below said index plate and carrying circularly arranged tables showing rise in twelve inches, the corresponding angle in degrees and trigonometric functions of such angle in radial groups for reading through the slot in the index plate, and means to rotate said indicia plate either frictionally with the telescope and the index plate or independently of either.

2. The instrument of claim 1 in which the indicia plate rotating means includes a frictional washer between the means to pivot the telescope and the index plate, a similar friction washer between the index plate and the indicia plate and also gearing including a knob located radially outward of the arc of the horizontal limb.

3. In a transit instrument a horizontal limb having circular scales thereon, an index plate registering with the scales on the limb, means to rotate the index plate with respect to the limb, a telescope base coaxial with the limb and the plate, a friction washer between the base and the plate, means for locking the base to the plate, resiliently held means resisting movement of the base relatively to the limb, and means locking the base to the limb, to prevent relative rotation.

4. In a transit instrument, a circular horizontal limb having scales thereon, a coaxial index plate having a radial slot, means for rotating the index plate, an indicia disk coaxial with the plate and having circular tables of data thereon for registry in radial groups with the radial slot, friction means to cause rotation of the plate with the disk, and means for rotating the disk independently of the index plate to bring a desired group of data in registry with the slot.

5. The instrument of claim 4 in which the means for rotating the disk includes a beveled gear carried by the disk, a beveled pinion meshing with said gear, and a knurled wheel located outside the periphery of the margin of the circular limb.

6. In a transit instrument a bowl-shaped horizontal limb having on its upper surface a circular scale including degrees along an arc and a scale of rises in twelve inches on the opposite arc, a center pivotally mounted in the center of the bowl and having an adjustable friction contact therewith to resist relative movement, a plurality of coaxial annular shoulders on the center, an index plate mounted on one of said shoulders and cooperating with the circular scale on the limb, an indicia disk mounted on another of said shoulders, means for rotating the disk, a telescope base mounted on the center, a friction disk between the telescope base and the index plate, a friction disk between the index plate and the indicia disk and means for locking the center to the bowl.

EZRA LEO CALLAHAN.

References Cited in the file of this patent

UNITED STATES PATENTS

| Number | Name | Date |
|---|---|---|
| 297,093 | Strong | Apr. 15, 1884 |
| 784,511 | Belyeu | Mar. 7, 1905 |
| 799,878 | Stockwell | Sept. 19, 1905 |
| 1,224,725 | Erickson | May 1, 1917 |
| 1,399,994 | Phoenix | Dec. 13, 1921 |
| 1,420,913 | de Bruine | June 27, 1922 |
| 1,665,627 | Rothweiler | Jan. 10, 1928 |

FOREIGN PATENTS

| Number | Country | Date |
|---|---|---|
| 236,111 | Great Britain | July 2, 1925 |
| 100,954 | Austria | Sept. 10, 1925 |